(12) United States Patent
Yue

(10) Patent No.: US 7,537,355 B2
(45) Date of Patent: May 26, 2009

(54) DIRECT TYPE BACKLIGHT MODULE

(75) Inventor: Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 101 days.

(21) Appl. No.: 11/505,610

(22) Filed: Aug. 16, 2006

(65) Prior Publication Data
US 2007/0139919 A1 Jun. 21, 2007

(30) Foreign Application Priority Data
Dec. 16, 2005 (CN) .................. 2005 1 0120691

(51) Int. Cl.
G09F 13/04 (2006.01)
(52) U.S. Cl. .................. 362/97; 362/615; 362/621; 362/611; 362/634; 362/610
(58) Field of Classification Search .................. 362/97, 362/29, 30, 225, 623–634, 621, 611, 614, 362/615, 561
See application file for complete search history.

(56) References Cited

U.S. PATENT DOCUMENTS

| 6,874,900 | B2 | 4/2005 | Hsieh |
| 6,880,947 | B2 | 4/2005 | Hsieh et al. |
| 6,880,953 | B2 | 4/2005 | Shin |
| 7,204,604 | B2* | 4/2007 | Chou .................. 362/227 |
| 2002/0097570 | A1* | 7/2002 | Greiner .................. 362/31 |
| 2004/0042194 | A1* | 3/2004 | Hsieh .................. 362/31 |
| 2004/0174717 | A1 | 9/2004 | Adachi et al. |
| 2005/0264160 | A1* | 12/2005 | Lee et al. .................. 313/485 |
| 2005/0265022 | A1* | 12/2005 | Kuo .................. 362/227 |
| 2007/0086179 | A1* | 4/2007 | Chen et al. .................. 362/27 |

FOREIGN PATENT DOCUMENTS

TW 576508 2/2004

* cited by examiner

Primary Examiner—Ali Alavi
Assistant Examiner—Evan Dzierzynski

(57) ABSTRACT

A direct type backlight module includes a light guide plate, a plurality of supporting units and a plurality of light sources. The light guide plate includes a bottom surface, and an emitting surface opposite to the bottom surface, a plurality of grooves formed on the bottom surface. The light sources are fixed in the grooves with the corresponding supporting units. The present backlight module has a thin body and also has a high optical brightness.

19 Claims, 6 Drawing Sheets

DIRECT TYPE BACKLIGHT MODULE

TECHNICAL FIELD

The present invention relates to backlight modules, more particularly, to direct type backlight modules for use in, for example, a liquid crystal display (LCD).

BACKGROUND

In a liquid crystal display device, liquid crystal is a substance that does not itself illuminate light. Instead, the liquid crystal relies on reflecting light from a light source, thereby displaying images and data. In the case of a typical liquid crystal display device, a backlight module powered by electricity supplies the needed light.

Generally, backlight modules can be classified into an edge lighting type or a bottom lighting type based upon the location of lamps within the device. The edge lighting type backlight module has a lamp unit arranged at a side portion of a light guiding plate for guiding light. The edge lighting type backlight modules are commonly employed in small-sized LCD due to their lightweight, small size, and low electric consumption. However, the edge lighting type backlight modules are not suitable for large-sized LCD (20 inches or more). A bottom lighting type backlight module has a plurality of lamps arranged at regular positions to directly illuminate an entire surface of an LCD panel. The bottom lighting type backlight modules have a higher efficiency of light usage and longer operational lifetime than the edge lighting type backlight modules, the bottom lighting type backlight modules are especially used in large-sized LCD devices.

Referring to FIG. 6, a typical direct type backlight module 10 is shown. The backlight module 10 includes a light diffusion plate 11, a number of spacers 12, a plurality of lamps 13, and a housing 14. The housing 14 is substantially in the form of a rectangular block. A cavity 142 is defined in a center portion of the housing 14. The cavity 142 is used to accommodate the lamps 13 and the spacers 12 therein. The lamps 13 are arranged on a bottom surface inside of the housing 14. The light diffusion plate 11 is disposed on the housing 14 covering the cavity 142. The spacers 12 are positioned between the bottom surface of the housing 14 and the light diffusion plate 11, so as to support the light diffusion plate 11. The backlight module 10 further includes a reflective film 15 deposited on an inner surface of the housing 14, for improving the backlight module 10 light energy utilization rate.

In use, light rays emitted by the lamps 13 are directly emitted into the light diffusion plate 11, and a substantial remainder of the light rays emitted from the lamps 13 that does not directly emit into the light diffusion plate 11 are reflected to the light diffusion plate 13 by the reflective film 15. Some of the light rays are reflected by an incident surface of the light diffusion plate 11, and these are reflected back to the light diffusion plate 11 by the reflective film 15. The light rays are diffused in the light diffusion plate 11, and thus surface light rays are output from an LCD panel (not shown) stacked on the light diffusion plate 11.

However, to enhance uniformity of light rays for the backlight module 10, there must be a certain space between the light diffusion plate 11 and the lamps 13 for eliminating potential dark strips caused by the reduced intensity of light between adjacent lamps 13. Therefore, it suffers from increased thickness and decreased luminance due to the space exiting between the light diffusion plate 11 and lamps 13. In addition, the light diffusion plate 11 is typically manufactured by uniformly dispersing a plurality of light diffusion particles into transparent resin matrix materials. Because the light rays are diffused at the light diffusion particles many times in the light diffusion plate 11, a part of the light energy would have been consumed in the light rays' diffusing process, thus a light brightness of the backlight module is decreased.

What is needed, therefore, is a direct type backlight module that overcome the above mentioned disadvantage.

SUMMARY

A direct type backlight module according to a preferred embodiment includes a light guide plate, a plurality of supporting units and a plurality of light sources. The light guide plate includes a bottom surface, and an emitting surface opposite to the bottom surface, a plurality of grooves formed on the bottom surface. The light sources are fixed in the grooves with the corresponding supporting units.

Other advantages and novel features will become more apparent from the following detailed description of the preferred embodiments, when taken in conjunction with the accompanying drawings.

BRIEF DESCRIPTION OF THE DRAWINGS

Many aspects of the direct type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
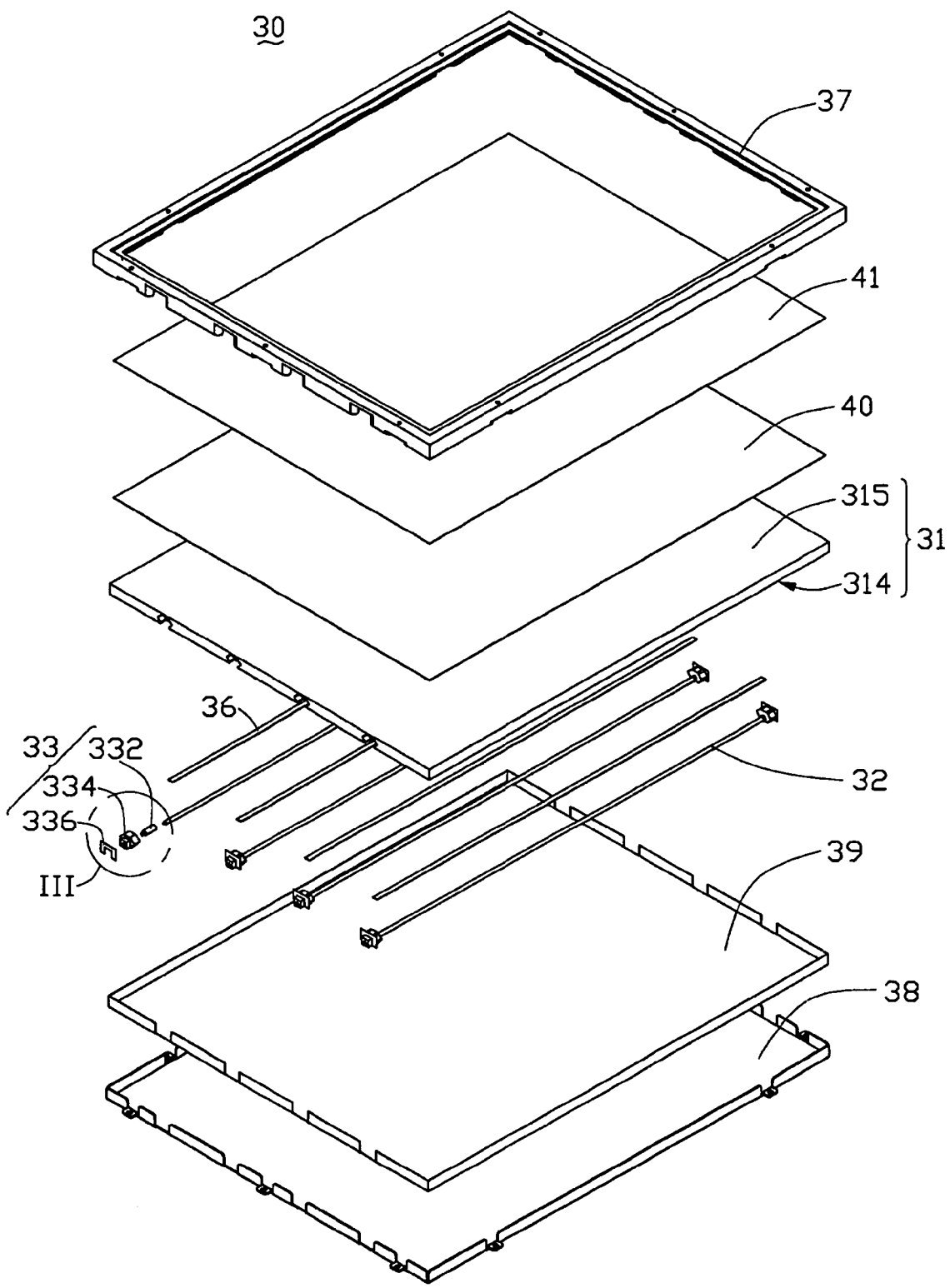
FIG. 1 is a schematic, exploded isometric view of a direct type backlight module according to a first preferred embodiment.

Referring to FIG. 1, a direct type backlight module 30 in accordance with a preferred embodiment is shown. The direct type backlight module 30 includes a light guide plate 31, a plurality of cold cathode fluorescent lamps 32 (CCFLS), and a plurality of supporting units 33.

Figure 2:
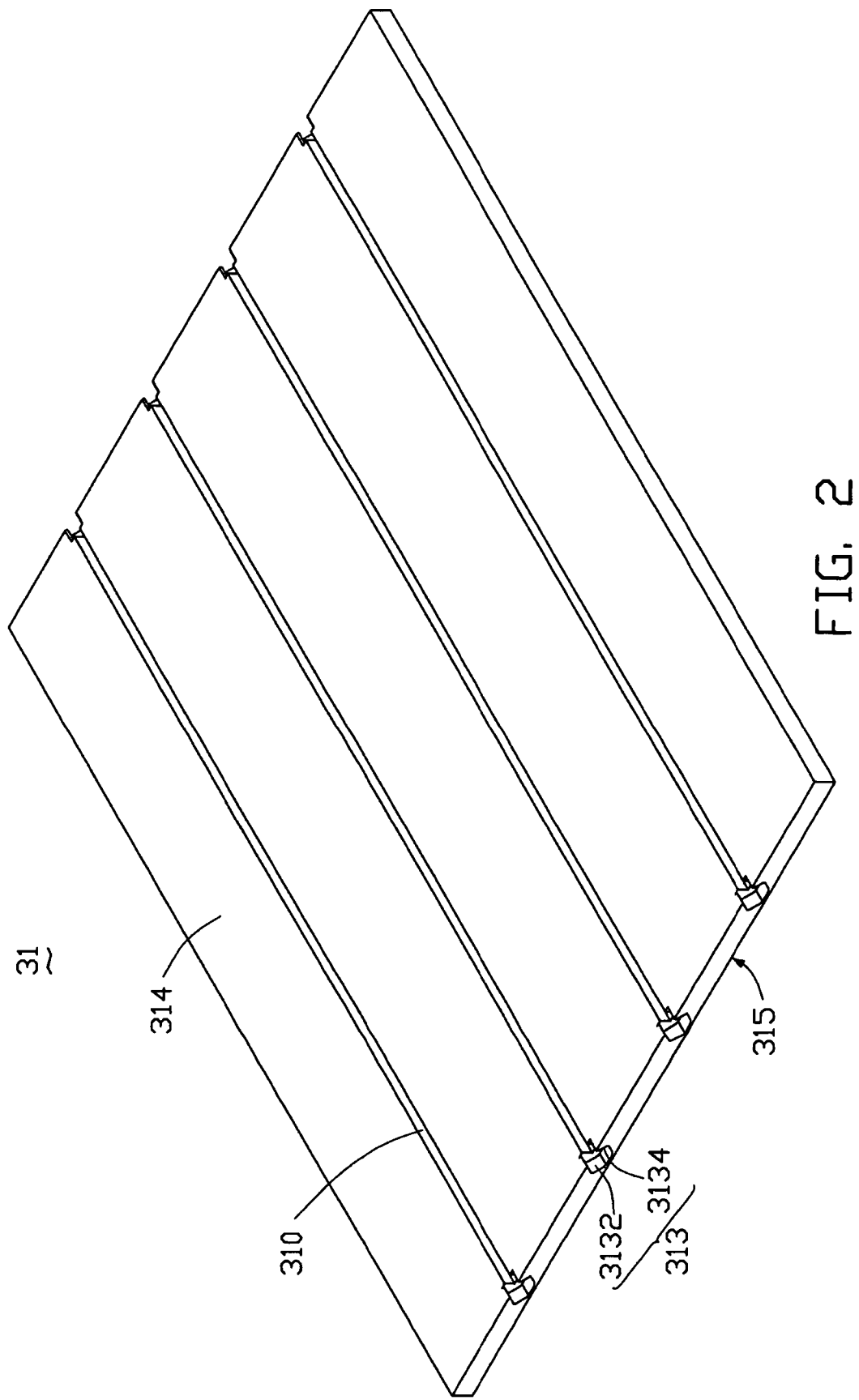
FIG. 2 is a schematic, isometric view of a light guide plate of the direct type backlight module of FIG. 1.

Referring to FIGS. 1 and 2, the light guide plate 31 includes a bottom surface 314, a light emitting surface 315 opposite to the bottom surface 314, and a plurality of grooves 310 defined on the bottom surface 314. Each groove 310 extends along a direction parallel to one side surface of the light guide plate 31. The grooves 310 are aligned apart and parallel to each other. The light guide plate 31 further includes a plurality of latching notches 313 defined at each end of the grooves 310. Each latching notch 313 communicates with a corresponding groove 310 for receiving the supporting units 33. In this embodiment, a shape of each groove 310 is configured to be a cuboid. In order to fix the CCFL 32 in the corresponding groove 310, depths and widths of the latching notches 313 are configured to be larger than that of the grooves 310, so as to match with the supporting units 33. Each latching notch 313 defines two opposite side surfaces 3132 and 3134 intersecting with an adjacent side surface of the light guide plate 31 perpendicularly. The two opposite side surfaces 3132 and 3134 each has a V-shaped cross-section taken along the adjacent side surface of the light guide plate 31.

Figure 3:
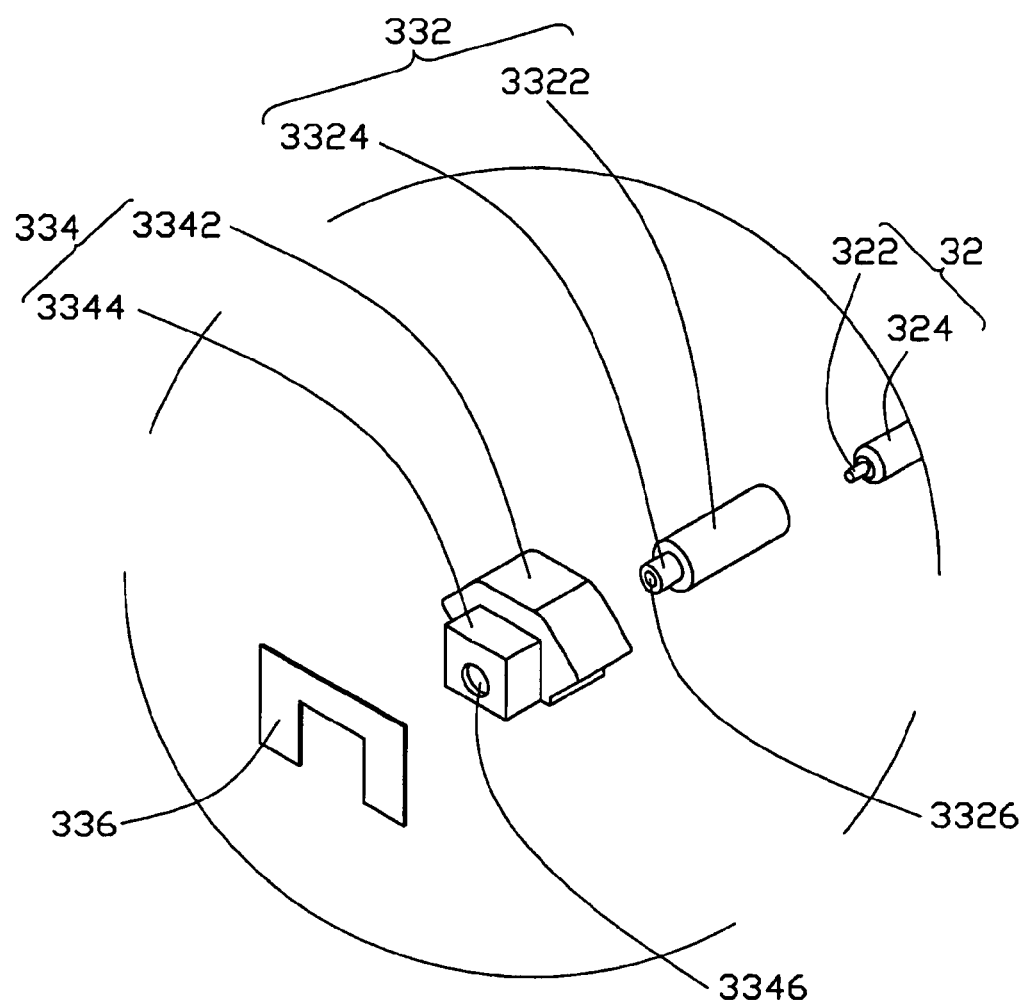
FIG. 3 is an enlarged view of a circle portion III of FIG. 1.

Referring to FIG. 3, each supporting unit 33 includes an electrode holder 332 and an electrode holder support 334. Each electrode holder 332 includes a first cylinder 3322 and a second cylinder 3324 connecting with a top surface of the first cylinder 3322. The first and second cylinders 3322 and 3324 each has a first through hole 3326 defined therethrough. The first through hole 3326 has different diameter sizes in the first and second cylinder 3322 and 3324 for receiving an electrode 322 and a part of a lamp body 324 of the CCFL 32, respectively. Each electrode holder support 334 includes a main body 3342 that is shaped so as to conform with an interior set shape of each latching notch 313. Furthermore, a rectangular block 3344 connects with the main body 3342. The main body 3342 and the rectangular block 3344 each has a second through hole 3346 defined therethrough. The second through hole 3346 has different diameter sizes in the main body 3342 and the rectangular block 3344 for receiving the electrode holder 332. The main body 3342 of the electrode holder support 334 could be received in the latching notch 313 tightly.

In assembly, the electrode 322 and the part of the lamp body 324 of the CCFL 32 are substantially inserted into the first through hole 3326 of the electrode holder 332, and then the electrode holder 332 is fixed in the second through hole 3346 of the corresponding electrode holder support 334 with the CCFL 32. Accordingly, the CCFL 32 could be mounted into the groove 310 by fixing the electrode holder supports 334 into the latching notches 313, correspondingly. The CCFLS 32 may be electrically connected to an exterior electric circuit (not shown) through the electrodes 322 thereof.

Also referring to FIG. 1, the direct type backlight module 30 further includes a plurality of upper-reflecting elements 36 sandwiched in the grooves 310 between the CCFLS 32 and the light guide plate 31. The upper-reflecting elements 36 are configured for reflecting light rays directly emitted from the CCFLS 32 into the light guide plate 31, so as to decrease the incidence of light rays and illumination directly above the CCFLS 32. In this embodiment, each upper-reflecting element 36 is an elongated sheet whose width is configured to match with the width of the grooves 310.

Also referring to FIGS. 1 and 3, each supporting unit 33 further includes a side-reflecting element 336 configured for avoiding the light rays from the CCFLS 32 being partly leaked through gaps defined between the light guide plate 31 and the supporting units 33, so as to improve light energy utilization rate. In the embodiment, the side-reflecting element 336 is a rectangular sheet having an opening corresponding to the rectangular block 3344. The side-reflecting element 336 is positioned on the rectangular block 3344 by inserting the rectangular block 3344 through the opening of the side-reflecting element 336. The side-reflecting element 336 may also be adhered to the main body 3342 of the electrode holder support 334 by a double-coated adhesive tape (not shown).

The light guide plate 31 further includes a plurality of microstructures (not shown) formed on the bottom surface 314 thereof, for improve the light guide plate 31 optical performance, such as high brightness and optical uniformity. A material of the light guide plate 31 could be selected from a group comprising of polymethyl methacrylate (PMMA), polycarbonate (PC), and other suitable transparent resin materials.

Also referring to FIG. 1, the backlight module 30 further includes an upper frame 37, a bottom frame 38, a reflecting sheet 39, a light diffusion sheet 40, and a brightness enhancement sheet 41. The bottom frame 38 is disposed under the light guide plate 31 for fixing and holding the light guide plate 31, CCFLS 32, and the supporting units 33. The light diffusion sheet 40 is positioned above the light emitting surface 315 of the light guide plate 31, diffusing emitted light rays and thereby avoiding a plurality of bright sections in the light guide plate 31. The brightness enhancement sheet 41 is positioned above the light diffusion sheet 40, collimating the emitted light rays uniformly to improve the brightness. The reflecting sheet 39 is positioned between the bottom frame 38 and the bottom surface 314 of the light guide plate 31, for reflecting light rays back into the light guide plate 31 again, so as to improve utilization efficiency of light energy. The upper frame 37 is positioned above the brightness enhancement sheet 41, and could be fixed to the bottom frame 38 tightly by a plurality of locking elements (not labeled) defined thereon. The upper frame 37 and the bottom frame 38 collectively receive and fix the light guide plate 31, the CCFLS 32, the supporting units 33, the reflecting sheet 39, the light diffusion sheet 40, and the brightness enhancement sheet 41.

In this embodiment, the upper frame 37 is formed of a plastic material. A material of the bottom frame is metal. Compared with the typical light diffusion plate, a thickness of the light diffusion sheet 40 is smaller, thus few light energy would be lost when the light passes through the light diffusion sheet 40 and a more uniform optical performance would be obtained.

Figure 4:
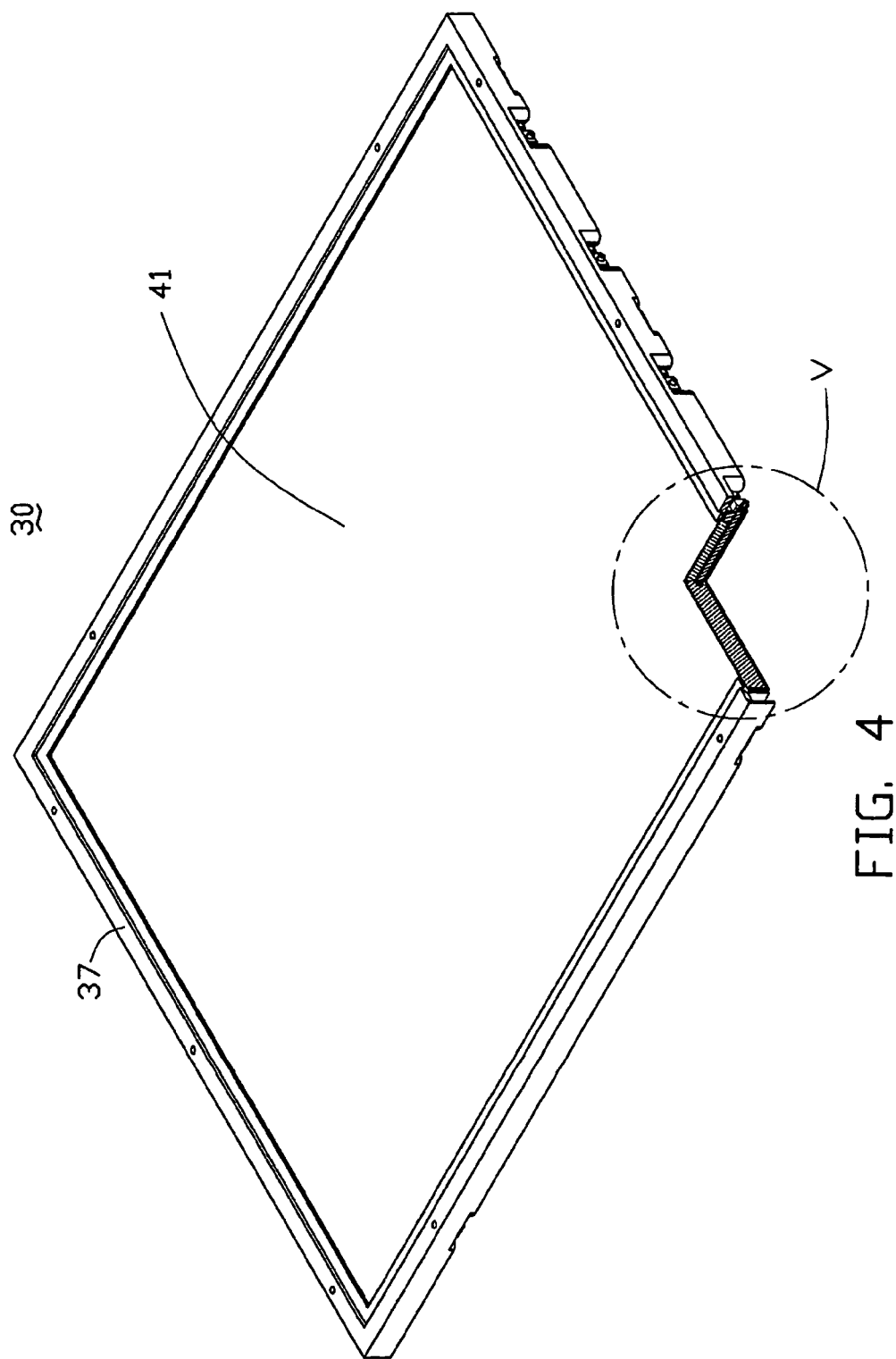
FIG. 4 is a schematic, assembled, partially cut away view of the direct type backlight module of FIG. 1.
Figure 5:
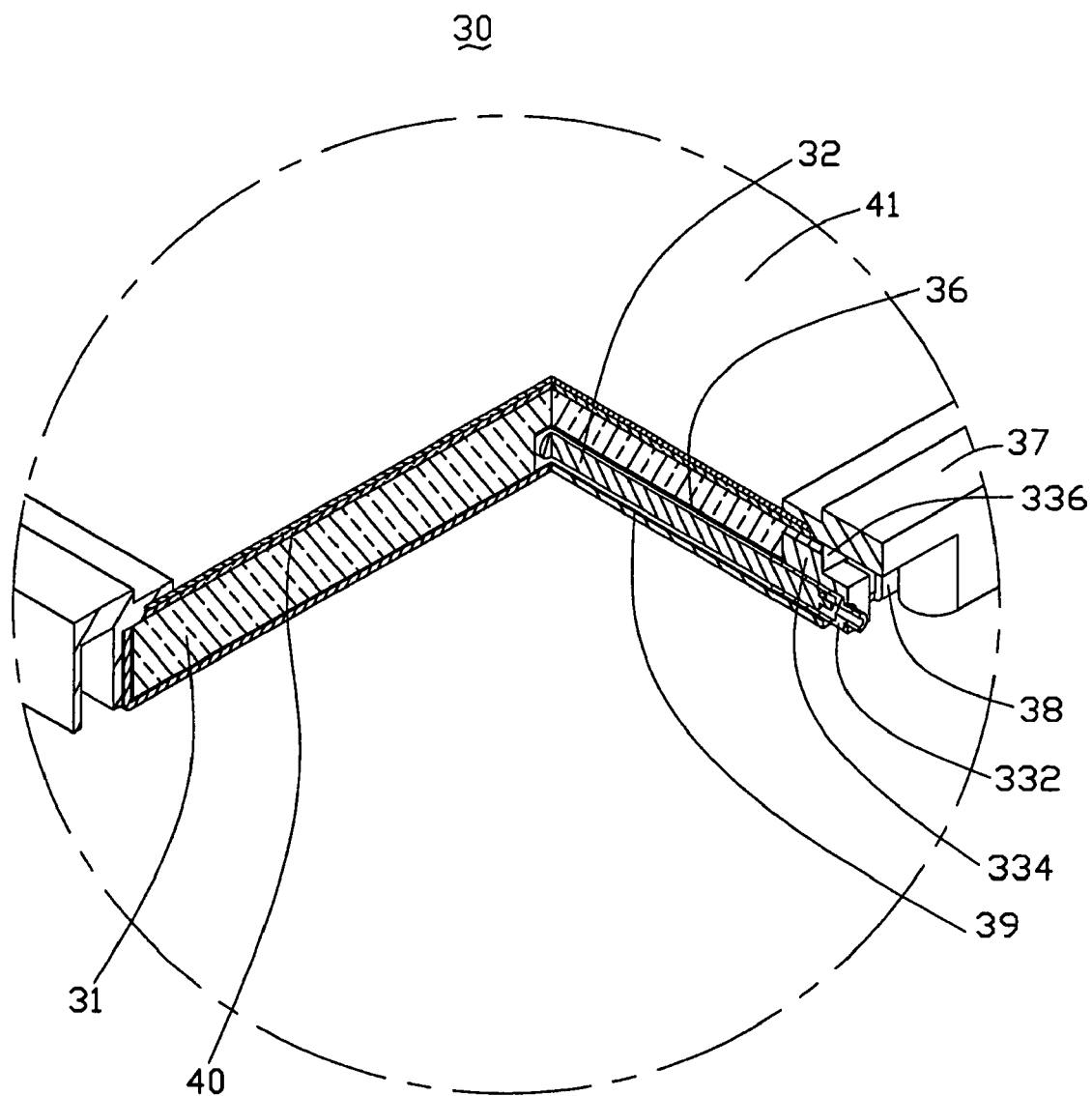
FIG. 5 is an enlarged view of a circled portion V of FIG. 4.
Figure 6:
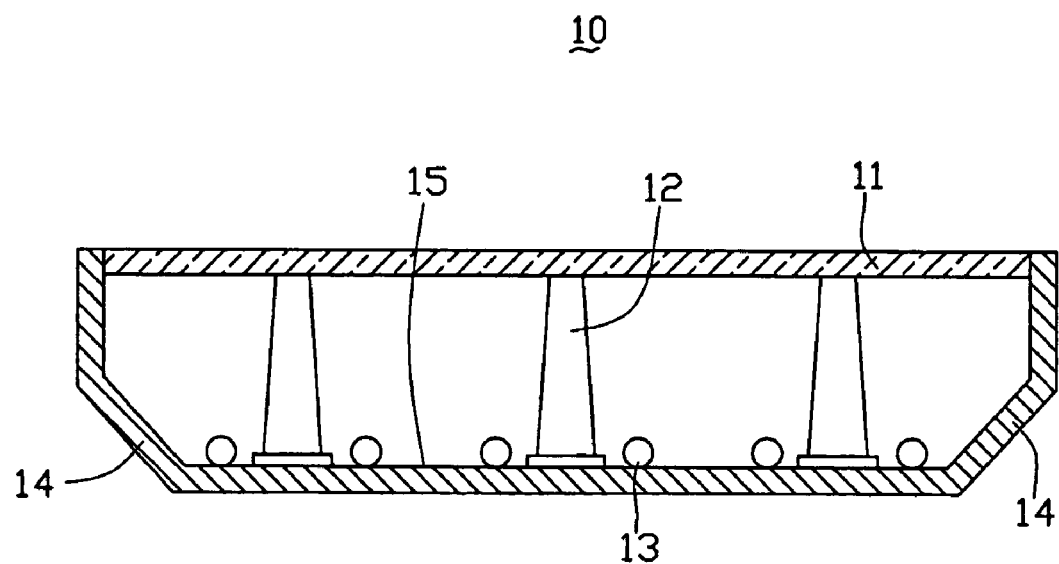
FIG. 6 is a schematic, cross-sectional view of a conventional direct type backlight module.

Referring to FIGS. 4 and 5, a damaged CCFL 32 could be easily replaced by being drawn out from one side surface of the backlight module 30. A method of replacing the damaged CCFL 32 includes following steps of: firstly, taking out the side-reflecting element 336 from the electron holder support 334 by riving off the double-coated adhesive tape; secondly, taking out the electrode holder support 334 from the electrode holder 332; thirdly, taking out the electrode holder 332 from the damaged CCFL 32; finally, drawing out the damaged CCFL 32 and assembling a good CCFL 32 again. Therefore, the backlight module 30 needs not to be disassembled whenever the CCFL 32 is damaged.

In other exemplary embodiments, the grooves of the light guide plate may also be in a form of a semicircular or other similar shapes. A shape of the upper-reflecting elements should be configured to match with the shape of the grooves, so as to reflect the light directly emitted from the linear light sources back into the light guide plate substantially. Field emission linear lamps, or other linear light sources may also be used as light sources in the present backlight module.

Compared with conventional backlight module, the preferred backlight module has a thin body due to an employment of a light guide plate and a plurality of linear lamps fixed in the light guide plate. When the preferred backlight module operates, light rays emitted from the CCFLS 32 pass through the inner side surface of the grooves and enter the light guide plate. The light rays are substantially reflected and refracted in the light guide plate 31, until, finally surface light rays are outputted from the light emitting surface 315, thus the preferred backlight module could have a high brightness of optical performance. In addition, the preferred backlight module has a relatively good light energy utilization rate due to avoid using a typical light diffusion plate.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A direct type backlight module comprising:
    a light guide plate having a light emitting surface, a bottom surface opposite to the light emitting surface, a plurality of grooves formed on the bottom surface, and a plurality of latching notches defined at each end of the grooves and communicating with the grooves;
    a plurality of supporting units disposed in the latching notches; and
    a plurality of light sources fixed in the grooves with the corresponding supporting units supporting each of the light sources at two ends thereof.

2. The direct type backlight module according to claim 1, wherein each latching notch defines two opposite side surfaces intersecting with an adjacent side surface of the light guide plate perpendicularly, and the two opposite side surfaces each has a V-shaped cross-section taken along the adjacent side surface of the light guide plate.

3. The direct type backlight module according to claim 1, wherein each supporting unit includes an electrode holder and an electrode holder support, the light sources being inserted into the electrode holder, the electrode holder being inserted into the electrode holder support, and the electrode holder support being fixed into the corresponding latching notch.

4. The direct type backlight module according to claim 3, wherein each electrode holder includes a first cylinder, a second cylinder connecting with the first cylinder, and a first through hole defined through the first and second cylinders.

5. The direct type backlight module according to claim 3, wherein each electrode holder support includes a main body that is shaped so as to conform with an interior set shape of each latching notch, and a rectangular block connecting with the main body.

6. The direct type backlight module according to claim 5, wherein each supporting unit further includes a side-reflecting element having an opening, the side-reflecting element is positioned on the rectangular block by inserting the rectangular block through the opening thereof, for avoiding the light rays from the light sources being partly leaked through gaps defined between the light guide plate and the supporting unit.

7. The direct type backlight module according to claim 1, further comprising a plurality of upper-reflecting elements sandwiched in the corresponding groove between the light source and the light guide plate, for reflecting a part of light rays directly emitted from the light sources back into the light guide plate.

8. The direct type backlight module according to claim 1, wherein the light sources is selected from a group comprising of a cold cathode fluorescent lamp and a field emission linear lamp.

9. The direct type backlight module according to claim 1, further comprising a bottom frame disposed under the light guide plate, for fixing and holding the light guide plate, the light sources and the supporting units.

10. The direct type backlight module according to claim 9, wherein a material of the bottom frame is metal.

11. The direct type backlight module according to claim 9, further comprising a reflecting sheet positioned between the bottom frame and the bottom surface of the light guide plate.

12. The direct type backlight module according to claim 1, further comprising a light diffusion sheet positioned above the light emitting surface of the light guide plate.

13. The direct type backlight module according to claim 12, further comprising a brightness enhancement sheet positioned above the light diffusion sheet.

14. The direct type backlight module according to claim 13, further comprising an upper frame positioned above the brightness enhancement sheet, and could be fixed to the bottom frame.

15. The direct type backlight module according to claim 14, wherein the upper frame is formed of a plastic material.

16. The direct type backlight module according to claim 1, wherein the grooves are in a form of cubic and semicircular shapes.

17. A direct type backlight module comprising:
    a light guide plate having a light emitting surface, and a bottom surface opposite to the light emitting surface, a plurality of elongated grooves formed on the bottom surface;
    a plurality of elongated light sources each received in a corresponding one of the grooves; and
    a pair of supporting units attached to opposite ends of each of the light sources, the supporting units releasably engaging in opposite ends of a corresponding groove so as to fix the light source in the corresponding groove.

18. The direct type backlight module of claim 17, wherein side reflecting plates are attached to the supporting units and configured for preventing leakage of light rays from the ends of the groove.

19. The direct type backlight module of claim 17, wherein a plurality of latching notches is defined at each end of the grooves to communicate with the grooves for receiving the supporting units, each latching notch defines two opposite side surfaces intersecting with an adjacent side surface of the light guide plate perpendicularly, and the two opposite side surfaces each has a V-shaped cross-section taken along the adjacent side surface of the light guide plate.

* * * * *